United States Patent
Pitwon et al.

(10) Patent No.: US 8,306,374 B2
(45) Date of Patent: Nov. 6, 2012

(54) OPTICAL CONNECTOR AND A METHOD OF CONNECTING AN OPTICAL CONNECTOR TO AN OPTICAL PRINTED CIRCUIT BOARD

(75) Inventors: Richard C. A. Pitwon, Fareham (GB);
Kenneth M Hopkins, Chichester (GB);
David A. Milward, Southampton (GB)

(73) Assignee: Xyratex Technology Limited, Havant (GB)

( * ) Notice: Subject to any disclaimer, the term of this patent is extended or adjusted under 35 U.S.C. 154(b) by 313 days.

(21) Appl. No.: 12/723,141

(22) Filed: Mar. 12, 2010

(65) Prior Publication Data
US 2011/0222821 A1    Sep. 15, 2011

(51) Int. Cl.
*G02B 6/12* (2006.01)
*G02B 6/26* (2006.01)
*G02B 6/42* (2006.01)

(52) U.S. Cl. ........ 385/14; 385/25; 385/27; 385/31; 385/33; 385/35; 385/39; 385/52

(58) Field of Classification Search ........ 385/52, 385/90
See application file for complete search history.

(56) References Cited

U.S. PATENT DOCUMENTS

| | | | |
|---|---|---|---|
| 5,095,517 A * | 3/1992 | Monguzzi et al. | 385/90 |
| 5,204,925 A * | 4/1993 | Bonanni et al. | 385/89 |
| 6,229,942 B1 * | 5/2001 | Engberg et al. | 385/39 |
| 6,390,690 B1 * | 5/2002 | Meis et al. | 385/88 |
| 7,490,993 B2 | 2/2009 | Pitwon | |
| 2004/0114873 A1* | 6/2004 | Alexeev et al. | 385/52 |
| 2011/0222821 A1* | 9/2011 | Pitwon et al. | 385/92 |

FOREIGN PATENT DOCUMENTS
WO   WO 2006/129069   12/2006
* cited by examiner

*Primary Examiner* — Rhonda Peace
(74) *Attorney, Agent, or Firm* — Pillsbury Winthrop Shaw Pittman LLP (57) ABSTRACT

The invention provides an optical printed circuit board connector, comprising: a housing having a major plane; an optical interface for connection in use to another optical interface on a device to which in use the optical printed circuit board connector is arranged to be connected, in which the optical interface on the connector is mounted such that it is twistable about a vertical axis in the major plane to vary the launch angle of light from the interface with respect to the housing.

15 Claims, 9 Drawing Sheets

Optical connector interface

OPTICAL CONNECTOR AND A METHOD OF CONNECTING AN OPTICAL CONNECTOR TO AN OPTICAL PRINTED CIRCUIT BOARD

The present invention relates to an optical connector and a method of connecting an optical connector to an optical or an electro-optical printed circuit board.

As data rates and required bandwidths in storage and computer systems have increased, the need for optical technology in such devices has emerged. Typically, user circuits and backplanes (or midplanes or motherboards) into which they might be plugged have been developed that include both optical and electrical components and channels. The maximum possible bandwidth density (data rate conveyed per area or volume of board) in optical channels are higher than in electrical channels.

The present assignee has carried out research over recent years into how to incorporate optical and electro-optical printed circuit board technology into high bandwidth systems and ultimately into its own storage systems. A pluggable connector solution has been developed as described in U.S. Pat. No. 7,490,993, the entire contents of which are hereby incorporated by reference. In U.S. Pat. No. 7,490,993, a line card connector plugs into an electro-optical PCB and aligns to embedded optical waveguides. An optical PCB is a PCB that includes optical channels, structures and/or connections. An electro-optical PCB is a type of PCB that includes both electrical and optical channels, structures and/or connections. An optical PCB can include only optical channels and components or can also include copper and/or other metals in the form of channels and planes etc.

In the assignee's own International patent application having publication number WO-A-2006/129069 (the entire contents of which are hereby incorporated by reference), there is disclosed an optical connector for connecting a user circuit to an optical backplane. The connector comprises an active or a passive photonic interface and includes a support that is selected to enable relative movement between a user circuit to which the connector is, in use, connected and the optical interface or alignment means associated therewith.

Although these systems work well, one problem associated with them and generally with optical waveguide design is that due to the constraint on waveguide bend radius, routing of the waveguides can take up significant surface area or "real estate" on the optical or electro-optical printed circuit board (PCB). In addition, this constraint means that more bends occur in the waveguide if the launch angle is inconveniently located and that can seriously impact the optical loss budget.

In some cases this is especially the case if the location and orientation of the connector with its associated launch angle is, say, near the edge of a PCB and/or in the opposite direction to where the waveguide must ultimately convey the data. Generally most commercial systems will have connector positions and orientations on the printed circuit board fixed by a form factor or standard whereas the routing path of the channels will usually be designed by the systems designer/manufacturers, therefore the designers must "work around" the fixed connector positions and orientations defined by the relevant standard and these could well be in inconvenient locations as described above. In other words, in a system in which the connector, due to some form factor or standard is required near the edge of a PCB and the optical launch angle would have the optical channel leaving from the connector towards the edge of the PCB, it might be that it is physically impossible in such a system to route the waveguides as desired as there is simply insufficient surface area to bend the waveguides without violating the minimum bend radius requirement. Therefore, in such systems, optical channels might simply not be a practical option.

Figure 1:
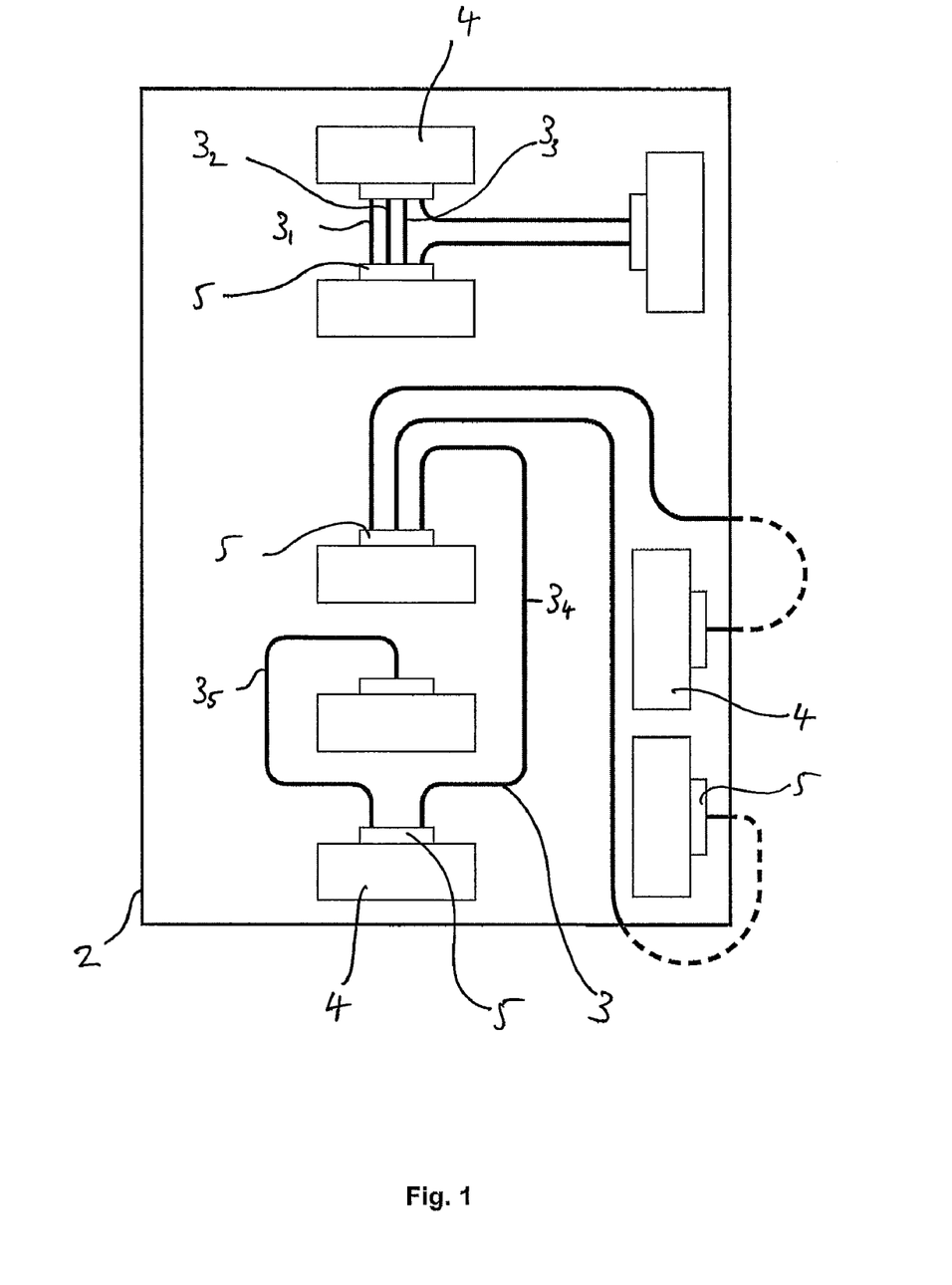
FIG. 1 is a schematic representation of a plan view of an optical printed circuit board.

FIG. 1 shows a schematic representation of an electro-optical printed circuit board (PCB). The PCB 2 includes various optical components 4 each having an optical input/output interface 5 and being connected via one or more waveguides 3. The waveguides are formed on the electro-optical PCB together with electrical connections (not shown).

In the example shown, the route for optical connection between the two uppermost optical components is straightforward. The optical waveguides $3_1$ to $3_3$ connect the optical interfaces directly. However, for the optical waveguides $3_4$ and $3_5$, to ensure that the bend radius of the optical waveguides is never below a certain threshold, which would introduce significant loss, the routing of the waveguides is such that the area taken up by the waveguides is more than is simply required were the most direct route taken. However, given that the optical interfaces of the optical components 4 are fixed, there is nothing that can be done about this. If the surface area is not available then optical communication between the connectors will not be a realistic option.

According to a first aspect of the present invention, there is provided an optical printed circuit board connector arranged to be connected in use to a first optical printed circuit board, the connector comprising: a housing; an optical interface for connection in use to another optical interface on a second optical printed circuit board to which in use the optical printed circuit board connector is arranged to be connected, in which the optical interface on the connector is mounted such that it is movable about an axis orthogonal to the plane of the first optical printed circuit board to which, in use it is connected, to vary the launch angle of light from the interface with respect to the housing and/or the first optical printed circuit board.

The optical PCB connector can remove the dependence of the waveguide launch direction on the standard orientation of the connector receptacle on an optical or electro-optical PCB. The part of the connector which includes the optical interface is allowed to rotate or twist around its longitudinal axis or, in other words, around an axis orthogonal to the plane of an optical PCB to which in use the connector is arranged to be connected. In a preferred example this is enabled by arranging the optical interface on a flexible laminate material that will allow it to be twisted with respect to the body of the connector. The first optical printed circuit board will typically be a user circuit such as a hard disk drive or other such data storage medium which is to be plugged into a backplane or midplane of a storage system.

The optical interface of the connector is in effect twistable such that light can be launched from it in any direction with respect to the connector housing. In conventional systems in which the angle of launch of light from the connector was fixed (typically in an orthogonal direction with respect to connector housing), if light from the connector was to be routed to another connector on the electro-optical PCB it is probable, given the usual parallel arrangement, common to many standards, of connectors on an electro-optical PCB, that quite some significant "real estate" on the PCB would be required to route the waveguides whilst not fouling the minimum bend radius requirements described above.

In contrast, in the present case, by providing a flexible optical connector in which the angle of launch of light with respect to the connector body can be changed as desired, the routing of waveguides can be optimised so that less real estate on the PCB is utilised for this purpose. Furthermore, as well as reducing the number of bends, the overall length of waveguide to achieve the same connectivity is reduced in comparison and therefore the optical loss incurred on the waveguide is significantly reduced. This will give rise to a reduction in power consumption as the optical power launched into the waveguide does not have to be as high in order to meet the receiver sensitivity requirements at the other end of the waveguide. There may also be a cost saving in terms of the required optical materials depending on the method of waveguide fabrication e.g. polymer printing whereby waveguides are directly deposited onto the substrate.

The connector can be used as either an active or a passive optical connector and as either for in-plane or out-of-plane connections to an optical or electro-optical PCB. Active optical connectors are connectors whereby the active photonics (lasers, photodiodes etc) are located on the interface to the optical PCB, usually with a lens to control the beam profile into and out of the waveguides. A number of previous co-owned patents and patent applications are based on active connectors. Passive optical connectors are connectors where there are no active photonics on the interface, but rather waveguides (e.g. fibres, polymer waveguides) that serve to carry light from the active photonics located somewhere else on the connector or user circuit which might be connected to the connector. These waveguides could include optical fibres or polymer waveguides on a flexible laminate, such as have been demonstrated by Swiss PCB company Varioprint.

In-plane optical PCB connectors are those which inject light directly into the plane of the optical PCB, i.e. directly into the embedded waveguides without the need for deflection of the light by mirrors. Out-of-plane optical PCB connectors are those whereby the light is launched in a direction orthogonal to the optical PCB and captured by deflection optics such as 45° mirrors, which turn the light at right angles and launch it into the embedded waveguides. The connector of the present invention can be used with either or both such types of optical PCB connectors.

The invention provides in an embodiment, an optical printed circuit board connector for arrangement on a first optical printed circuit board, the connector comprising an optical interface for connection in use to an optical interface on a device e.g. a second optical printed circuit board, to which in use the optical printed circuit board connector is connected. The optical interface is mounted on the connector such that it is movable about an axis orthogonal to the plane of the first optical printed circuit board.

In an embodiment, the connector comprises an electrical interface unit. In other words, the connector can serve as both a conventional electrical connector for a user circuit to an electro-optical printed circuit board and also an optical connector. Where the electro-optical printed circuit board is a backplane or midplane of a storage system the connector enables high data bandwidths to be achieved whilst enabling reduced surface area usage by the waveguides on the backplane or midplane.

Preferably, the electrical interface unit is provided on a rigid PCB material. In other words, it is only the optical connector that requires the flexibility as the electrical connection mechanism can be conventional.

In one embodiment, the housing has an opening for receiving a user circuit for connection to the optical printed circuit board connector, wherein, in use, the user circuit is connected via the optical printed circuit board connector to an electro-optical printed circuit board, such as a backplane or data storage system midplane. Thus, the connector is effectively a blank unit into which a desired user circuit can be plugged.

In one embodiment, the connector forms an integrated part of a user circuit such that the user circuit can be connected to an electro-optical printed circuit board for electrical and optical communication therebetween. In contrast to the example in which the connector has a socket for connection to any appropriate user circuit, in some embodiments the connector forms an integrated part of the housing of a user circuit, which can then easily and conveniently be connected to an electro-optical printed circuit board.

In a preferred embodiment, the connector comprises a rotatable brace assembly henceforth referred to as a capstan in which the optical interface is arranged. Thus, the capstan provides some structural rigidity to the connector whilst still ensuring that the interface has the necessary degree of rotational freedom with respect to the connector housing. This means the connector is strong, robust and reliable whilst being appropriately flexible.

In one example, the capstan assembly comprises a first part arranged to be fixedly mounted to the housing of the connector and a second part, rotatably mounted to the first part and arranged to house the optical interface, such that upon twisting of the second part with respect to the first part, the angular orientation of the optical interface with respect to the connector housing is varied.

In one preferred embodiment, movement between the first and second parts of the capstan is indexed. Thus, a user can easily select a desired relative angular position between the fixed first part of the capstan, (and therefore the connector housing to which the first part is fixedly mounted or integrally formed with), and the second moveable part of the capstan (and therefore the optical interface).

The optical interface may be a passive or an active optical interface.

According to a second aspect of the present invention, there is provided a method of connecting a first user circuit to an electro-optical printed circuit board, the method comprising, providing a connector having a housing and a flexible planar layer arranged connected to or within the housing, with an optical interface arranged at the distal end of the flexible planar layer for connection in use to an optical interface on the electro-optical printed circuit board, and varying the angle, with respect to the connector housing, of the optical interface arranged at the distal end of the flexible planar layer by twisting along the longitudinal axis (and therefore rotational axis) of the flexible planar layer to rotationally align the optical interface with an optical interface of the electro-optical printed circuit board.

A method is provided by which the optical interfaces of a connector and an electro-optical printed circuit board can be aligned such that simple routing of waveguides on the electro-optical printed circuit board can be achieved. Where more than one connector is provided, the method provides a simple and robust means by which optical communication can be established between the connectors whilst minimising the surface area or "real estate" required for the waveguides on the electro-optical printed circuit board.

According to a third aspect of the present invention, there is provided a method of connecting a first user circuit to an optical printed circuit board, the method comprising, providing a connector having a housing and a flexible optical channel arranged connected to or within the housing, with an optical interface arranged at the distal end of the flexible optical channel for connection in use to an optical interface on the optical printed circuit board, and varying the angle, with respect to the connector housing, of the optical interface arranged at the distal end of the flexible optical channel by twisting along the longitudinal axis of the flexible planar layer to align the optical interface with an optical interface of the optical printed circuit board.

According to one aspect of the present invention, there is provided an optical printed circuit board connector, comprising: a housing; a flexible planar layer arranged connected to or within the housing; an optical interface arranged at the distal end of the flexible planar layer for connection in use to another optical interface on a device to which in use the optical printed circuit board connector is connected, in which the optical interface on the connector is mounted such that it is twistable about the longitudinal axis of the flexible planar layer.

Embodiments of the present invention will now be described in detail with reference to the accompanying drawings, in which.

Figure 2:
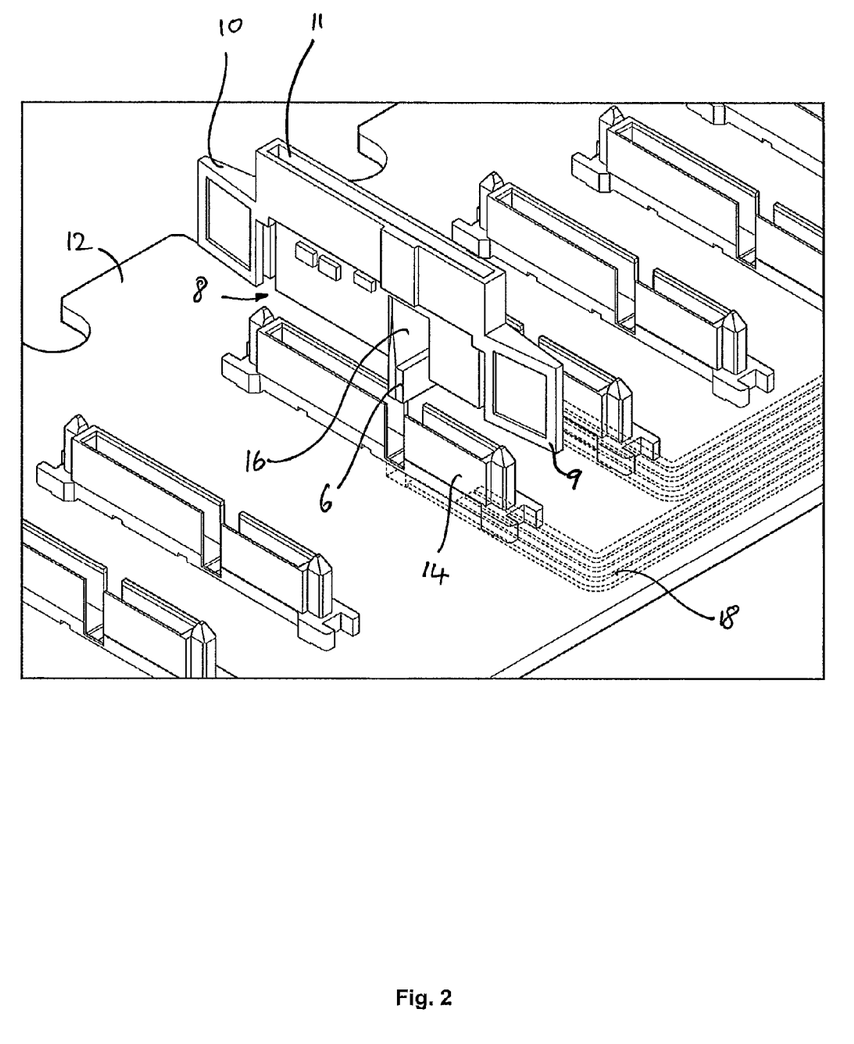
FIG. 2 is a schematic representation of a perspective view of a twistable connector (without capstan assembly) for an optical printed circuit board.

FIG. 2 shows an example of a connector for an optical printed circuit board. The connector is shown immediately prior to connection with an electro-optical PCB 12. The connector generally is made up of a housing 9 and includes both optical components 6 and electrical connectors 8, which are typically provided by one or more PCBs. It will be understood that the connector includes an optical interface mounted such that it is movable as will be described below. The connector housing 9 in use is arranged connected to a printed circuit board (not shown). Typically the printed circuit board is arranged plugged into an opening 11 formed as part of the dongle 10. The printed circuit board, which may be referred to as a "first printed circuit board" is, by the connector, connected to a second printed circuit board 12. The second printed circuit board has provided on it a housing 14 for mating engagement with the housing 9 and connector on the first printed circuit board.

The connector on the first printed circuit board (not shown) includes an optical interface mounted such that it is movable about an axis orthogonal to the plane of the first printed circuit board to which, in use it is connected, so as to vary the launch angle of light from the interface with respect to the housing 9 of the connector. The connector can be used only as an optical connector, i.e. only for making optical connections or it can be used as part of a connector that also includes electrical connections as might be required for connecting to an electro-optical PCB.

In the specific example shown, the connector is provided as an active in-plane optical connector mounted on a dongle 10. A dongle is a small piece of hardware that connects to another piece of hardware. Although the term "dongle" is often used to refer to a broadband wireless adaptor in the present case it is used in its more general way to refer to an intermediary connector device between two user circuits or between a user circuit and a backplane (or connector housing mounted thereon) that imparts some desired additional functionality not otherwise present in the user circuit(s) and/or backplane. It will be appreciated that although shown as a dongle the connector could be integrated onto another component such as a hard disk drive or the like and act as the connector of the hard disk drive to enable the hard disk drive to be connected to a backplane or storage system midplane. In other words, the connector can be an integrated part of another piece of hardware or could be provided as a stand alone dongle.

In this example, the PCB 12 to which the dongle 10 is connected includes a base connector unit 14 with which the dongle 10 engages upon application of a connecting force downwards into the plane of the PCB 12.

Figure 3:
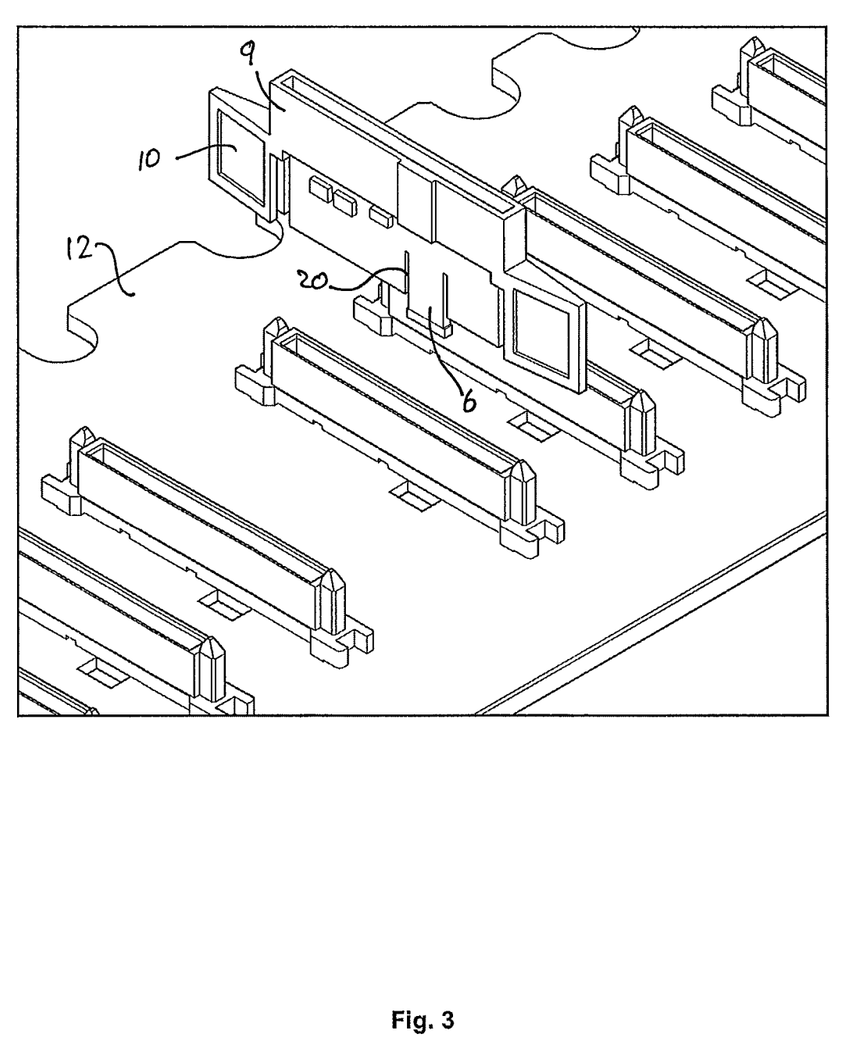
FIG. 3 is a schematic representation of a perspective view of a connector for an optical printed circuit board.

In many examples, the orientation of the connector receptacles or base connector units 14 is constrained by the system design standard. This is particularly the case in the example of a hard disk drive storage array midplane which might be defined by the PCB 12 shown in FIGS. 2 and 3. Referring in detail to FIGS. 2 and 3, the dongle 10 includes a PCB that itself includes optical connections and an interface 6 in the form of an active optical head. Preferably, the active optical head 6 is arranged on a flexible laminate PCB material 16. Examples of suitable flexible materials include Kapton polyimide.

The dongle 10 includes a PCB that is used to incorporate both the electrical connections 8 and the optical connections 6. Small cut-outs 20 are provided in the PCB around the optical head section to increase flexibility and the degree to which the distal end of the optical head section may be twisted relative to the dongle. The rigid support layers of the main PCB, e.g. the FR4 substrate, have been etched away on the optical head platform 6 to leave only the flexible laminate material. Therefore, the optical head is provided with mechanical freedom in such a way that it is able to swivel or twist around its longitudinal axis, i.e. the axis orthogonal to the plane of the optical or electro-optical PCB 12 as shown in FIG. 2, into which it is connected.

The housing 9 of the connector has a major plane, which is usually the same as or parallel to the plane of the user circuit that is inserted into the connector or is perpendicular to the plane of the PCB 12 into which it is plugged. The optical interface 6 is provided on, in this example, the flexible layer so that it is twistable about a vertical axis in the major plane to vary the launch or receiving angle of light from the interface with respect to the housing. In other words, if a plane is defined perpendicular to the plane of the PCB and an axis is defined as vertical meaning it too is perpendicular to the plane of the PCB and is in the major plane of the connector housing, the degree of freedom of the optical interface is about this vertical axis. The housing may be made from any appropriate material. Typically, it is made from a plastic material.

In the example shown in FIG. 2, the optical head 6 has been rotated by 90 degrees around its longitudinal axis, as defined above, compared to the normal position (as shown in FIG. 3 and described below).

The electro-optical PCB 12 includes waveguides 18 for carrying optical signals along it. As can be seen, the waveguides 18 approach the optical interface 6 on the dongle 10 and then turn 90 degrees to pass longitudinally along the length of the electro-optical PCB 12. By providing the optical interface in the twisted configuration, i.e. at a 90 degree angle to the major plane of the dongle 10, an additional 90 degree bend in the waveguide routing is omitted. Thus, a more direct routing of the waveguides is possible and bending of the waveguides is minimised. As explained above, it is bending of the optical waveguides from a previously unbent configuration that can typically lead to losses and/or damage to the waveguides in normal use.

It is preferred that the optical head 6 can be rotated around its axis by up to 180 degrees in either direction. This allows the optical connector to support the full range of possible waveguide launch angles given the fixed orientation of the connector receptacle 14. It is preferred that the optical interface be provided on a flexible support layer e.g. like the Kapton Polyimide mentioned above, but other configurations could also be used. For example, optical fibres could be used which are inherently flexible. The optical interface could alternatively be passive. Thus, in one embodiment, the optical interface is active, i.e. an optical engine such that there would be provided electrical data paths on the flexible laminate. Alternatively, the optical interface is a passive interface whereby there would be provided waveguides (or fibres) on the flexible laminate. (In a further alternative the fibres could be a stand alone bundle with no flexible laminate backing.

FIG. 3 shows a schematic representation of the optical dongle 10 in which the optical interface 6 is in its original configuration, i.e. it has not been twisted at all so that it is coplanar with the remainder of the circuit board arranged within the connector. The housing 9 is like that of the device of FIG. 2. The cut-outs 20 can be seen made in the PCB around the optical head section to increase the flexibility of the optical head section. Typically, one way to make the device, is to use a piece of rigid optical PCB material, make cut outs to define an optical interface region and then remove the rigid support layers by etching or otherwise so as to provide the required flexibility and degrees of movement for the optical interface. In another embodiment, electronic data lines are provided, instead of or as well as the optical waveguides 28, leading to an active optical interface, i.e. a small transceiver (optical engine) which carries out electro-optical and opto-electronic conversion.

Figure 4:
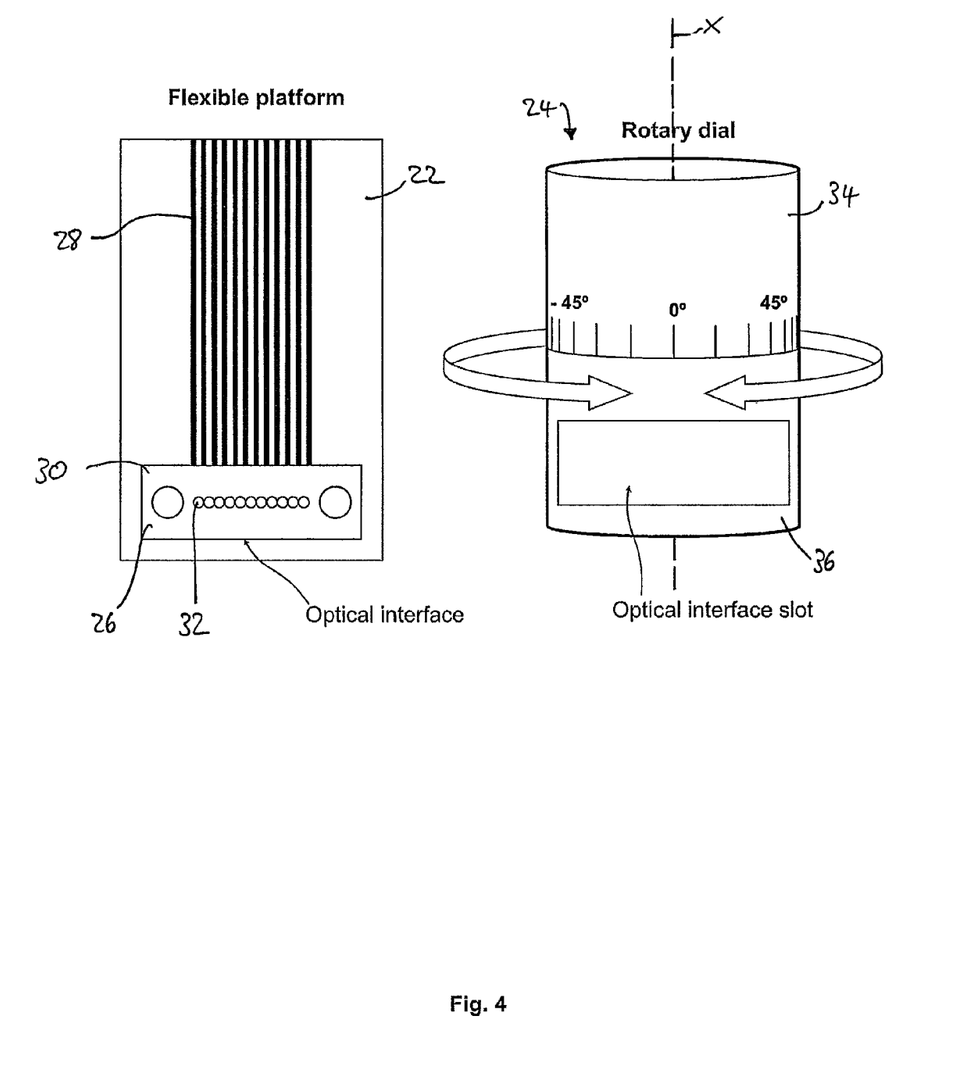
FIG. 4 is a schematic representation of the components of an optical capstan assembly.

FIG. 4 shows a schematic representation of the components of an optical capstan assembly. The components include both the flexible platform 22 and a rotary brace 24. As described above, the flexible platform 22 is typically made up of the flexible laminate material such as Kapton Polyimide from which the PCB is made, with rigid parts of the PCB having been etched away so as to provide the required flexibility. An optical interface unit 26 is provided connected to waveguides 28, which serve to provide a path for light to and from the optical interface 26. Typically, the optical interface will be based on a parallel optical interface standard such as the MT/MPO standard, which means it could be mated to an MT component such as an MT ferrule 30. Lenses such as graded index (GRIN) lenses 32 are provided as part of the optical interface to ensure desired focusing or collimation of light as it passes through the optical interface.

In this example, the optical capstan assembly 24 is made up of a rotary dial having an upper portion 34 and a lower portion 36. The lower portion 36 has an opening 38 for receiving the optical interface 26. The upper portion 34 and the lower portion 36 of the optical capstan assembly are arranged so as to be rotatable relative to each other about a common longitudinal axis X. Thus, with the optical interface 26 arranged and fixed within the optical interface slot 38, by moving the lower portion 36 of the capstan assembly relative to the upper portion 34, the output angle of the optical interface can be set accordingly. Typically, the upper portion might be fixed to the housing 9 of the dongle 10 (neither housing nor dongle shown in this Figure).

Figure 5:
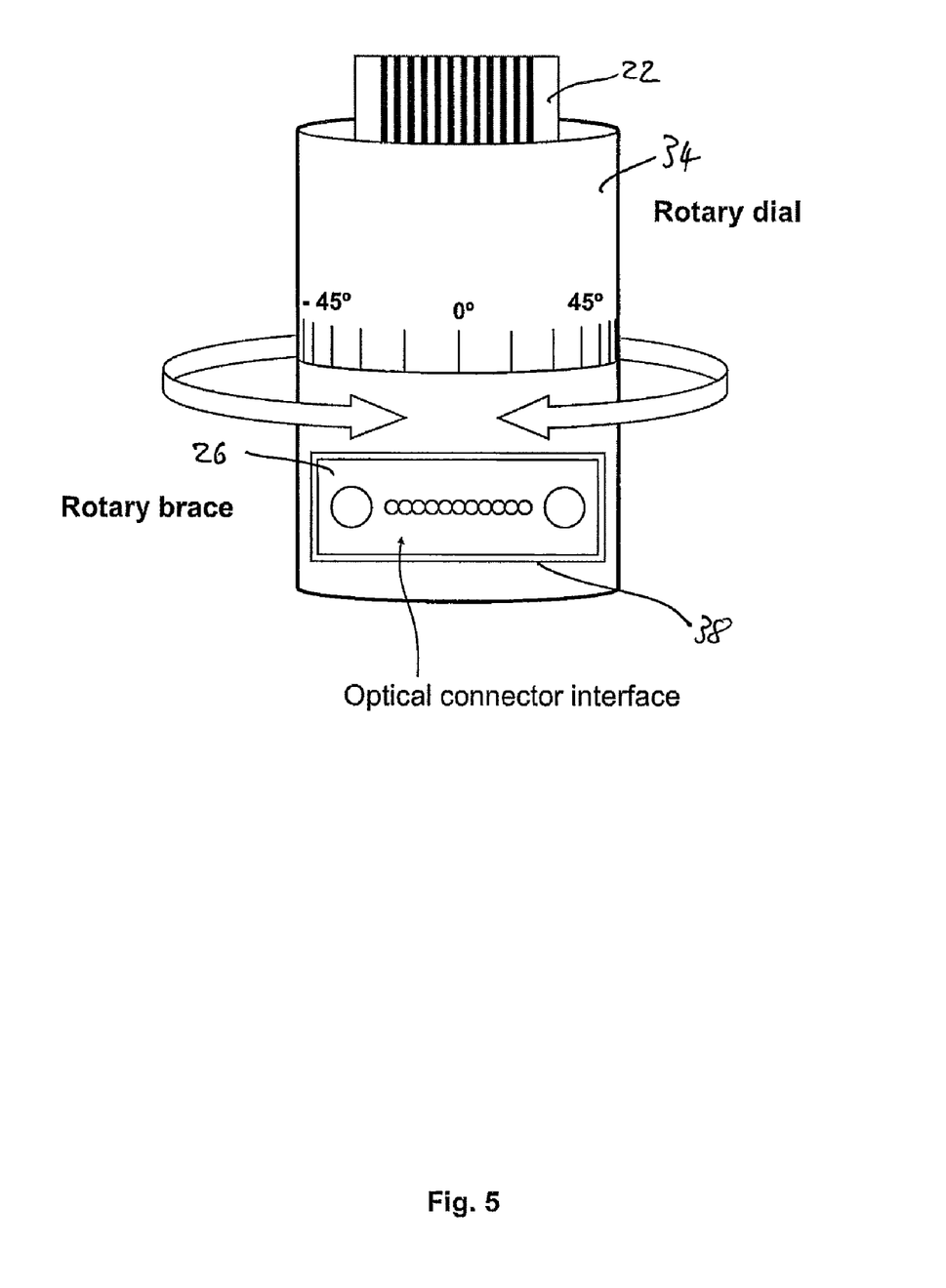
FIG. 5 is a schematic representation of the components of FIG. 4 in an assembled form.

FIG. 5 shows a schematic representation of the optical capstan assembly in which the two components shown in FIG. 4 are assembled. As can be seen, the flexible platform 22 enters the upper portion 34 of the capstan assembly from above and the optical interface 26 is arranged within the optical interface slot 38. Thus, the capstan assembly provides a means of physically protecting the components of the optical interface whilst simultaneously allowing accurate angular positioning of the optical interface.

Figure 6:
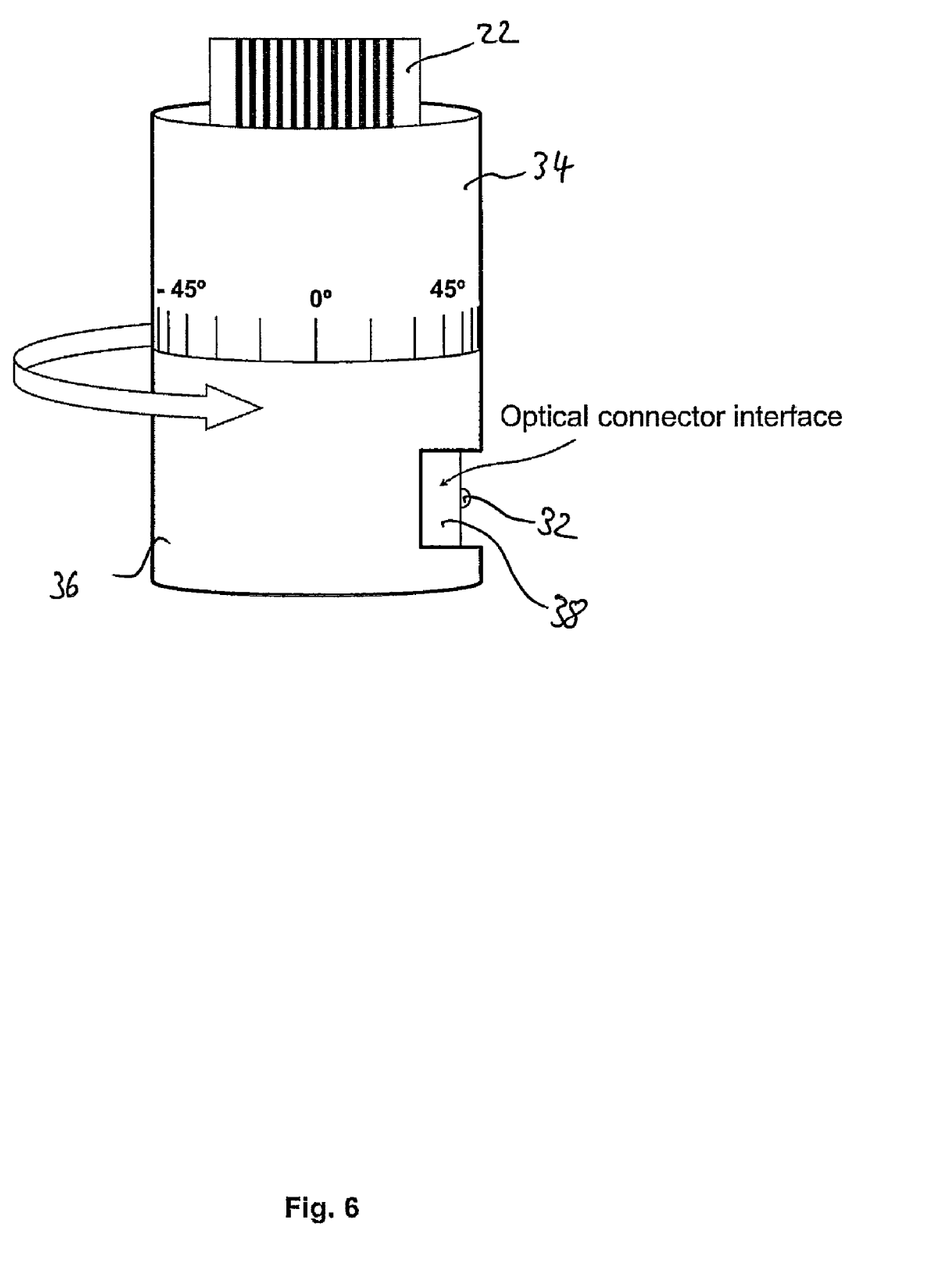
FIGS. 6 and 7 show schematic representations of the optical capstan of FIG. 5 in alternative angular configurations.
Figure 7:
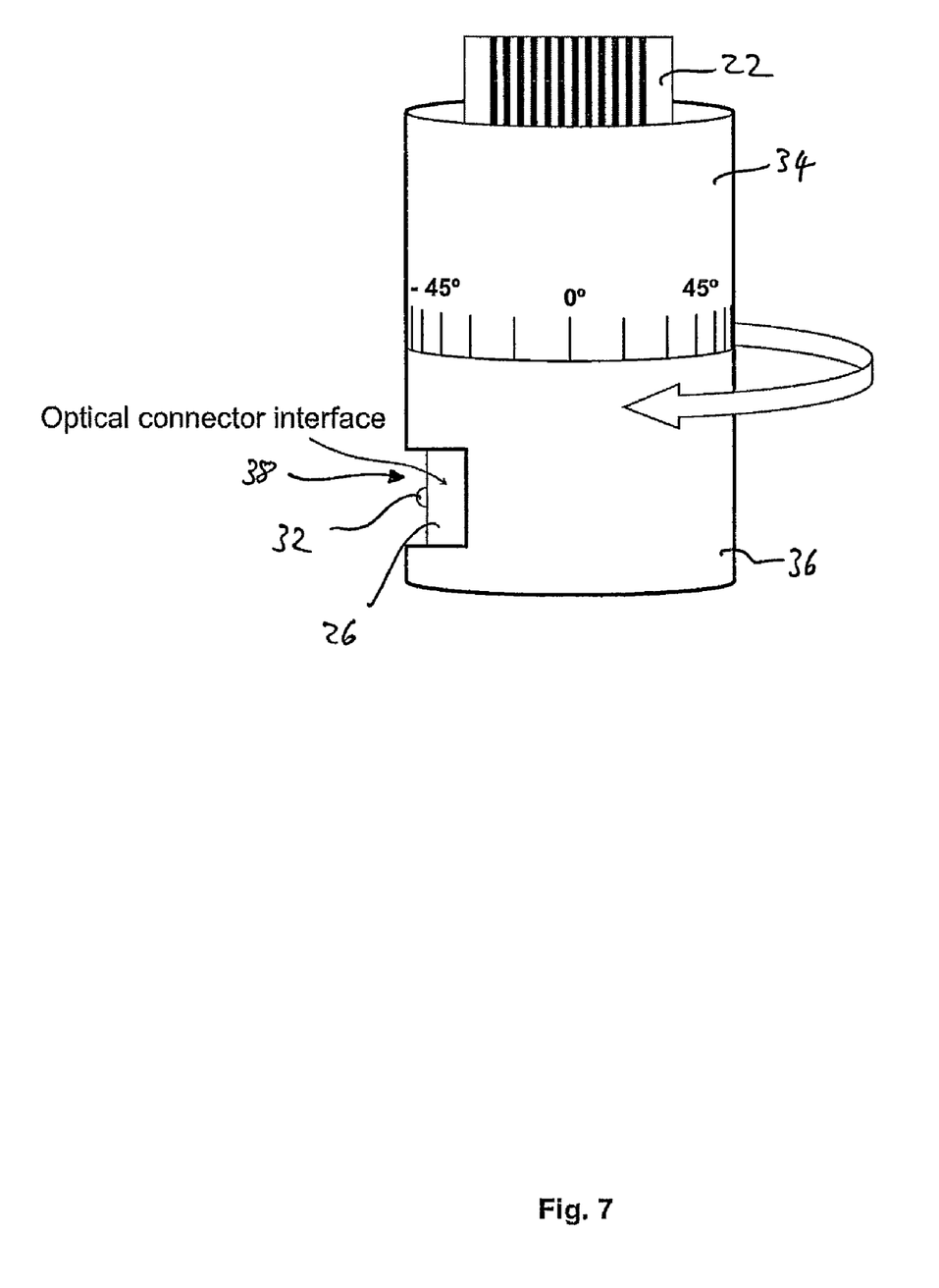

FIGS. 6 and 7 show schematic representations of the optical capstan assembly with the lower portion 36 rotated in opposite directions such that with the upper portion in the same fixed configuration, in FIG. 6 the optical interface points to the right of the page at 90° from its original orientation, whereas in FIG. 7 the optical interface points to the left of the page at −90° from its original orientation. Preferably, the lower portion 36 and the upper portion 34 of the assembly are spring biased together and preferably alignment notches might be provided in one of the parts with projections being provided in the other so as to enable a semi-fixed angular configuration to be provided between the upper and lower portions. In other words, there are preferably provided indexed relative positions of the upper and lower portions of the optical capstan assembly. In one particular example, the engagement between the upper and lower portions is provided by a circular rail and groove arrangement, i.e. a circular rail on one portion is fitted into a circular groove in the other thus keeping both portions together while allowing the freedom to rotate. Preferably, protective stop (not shown) is provided in the circular groove or rail arrangement holding the upper and lower portions together and is registration.

In use, the upper portion 34 of the optical capstan assembly is provided fixed to the housing 10 of the dongle, as shown in FIGS. 2 and 3. The capstan assembly itself is not shown in FIGS. 2 and 3 so that the flexible optical or electronic PCB can be seen clearly. However, with reference to FIG. 2, the upper portion 34 of the optical capstan assembly might typically be connected to or formed integrally with the region 13 of the dongle 10.

It will be appreciated that due to the requirement for the flexible polyimide layer 16 to twist around its longitudinal axis, it will have a greater length than the other parts of the PCB from which it is formed. As can be seen in FIG. 3, the length of the optical flexible circuit board is greater than that of the PCB to its lateral sides. This ensures that as the capstan assembly is twisted, there is sufficient length and give in the flexible optical polyimide layer to ensure that the device operates as required.

The assembly therefore provides a rotatable optical head which provides design flexibility for optical waveguides on an optical or electro-optical PCB. In other words, since the angle of launch or reception of an optical signal from or to the rotatable optical head can be varied relative to the housing of the connector, the routing of the optical waveguides on the PCB to which the connector is connected, can be optimised. The number of turns and bend radii on a waveguide can be controlled by providing a more preferable optical launch angle and therefore minimising the number of bends and reducing bend losses in the waveguides themselves.

The use of an optical capstan or rotary brace allows simple user adjustment of the optical head orientation. Furthermore, the use of an indexed arrangement ensures that a user will be able accurately to position the lower portion of an optical capstan assembly relative to the upper portion.

In conventional systems, connector receptacle orientations and optical connector heads are fixed, which forces design constraints on the waveguides on the optical PCB. Due to fundamental constraints on waveguide bend radii, routing of waveguides can take up too much room especially if the designated launch angle determined by the orientation of the connector is inconveniently located, say, near the edge of the PCB and/or in the opposite direction to where the waveguide must ultimately convey the data. In addition, this constraint means that more bends occur in the waveguide if the launch angle is inconveniently located and that can have a deleterious impact on the optical loss budget. The present system provides an optical PCB designer with full freedom and flexibility to adjust the launch angle of the waveguides to the most efficient routing configuration, i.e. one that will yield the least optical loss.

To connect a user circuit to a PCB such as that shown in FIGS. 2 and 3, a user configures the optical assembly so that it is "pointing" in the right direction. In other words, the angle of the output from the optical interface is configured appropriately. Then, once done, the optical dongle (or the user circuit if the connector is integrated) is plugged into the socket on the PCB. The socket 14 on the PCB is appropriately configured to receive the dongle or user circuit. Typically, the socket 14 will include both electrical connections to connect with electrical connections on the connector 10, and clearance to the optical PCB 12 for an optical interface for engagement and mating with the optical interface on the dongle or user circuit. The socket 14 may be a SAS or SATA receptacle modified (as shown in FIGS. 2 and 3) to provide clearance to the optics within the optical PCB and sufficient room to accommodate the rotary brace as shown in any of FIGS. 5 to 9.

It will be appreciated that in the example shown in FIGS. 2 and 3, the optical capstan assembly is provided as part of an optical dongle, i.e. an intermediary device between an optical PCB and another circuit which might be connected to the PCB. For example, in FIGS. 2 and 3, the open slot 11 might be for receiving a user circuit such as a hard disk drive or other such circuit. In some cases, the optical capstan assembly and/or the dongle 10 might be integrated as part of a user circuit for connection to electro-optical backplane 12.

Figure 8:
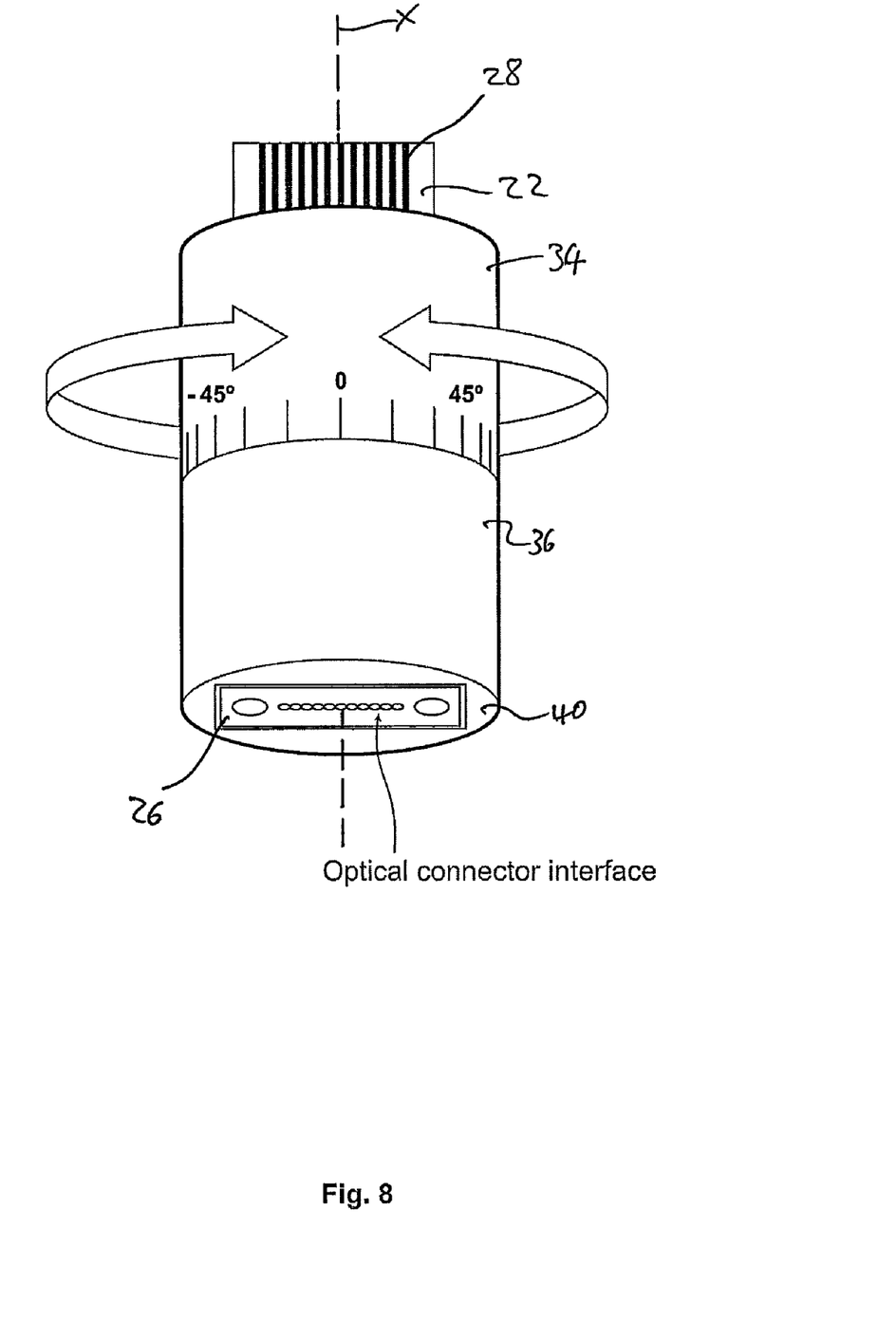
FIGS. 8 and 9 show schematic representations of another embodiment of an optical capstan.
Figure 9:
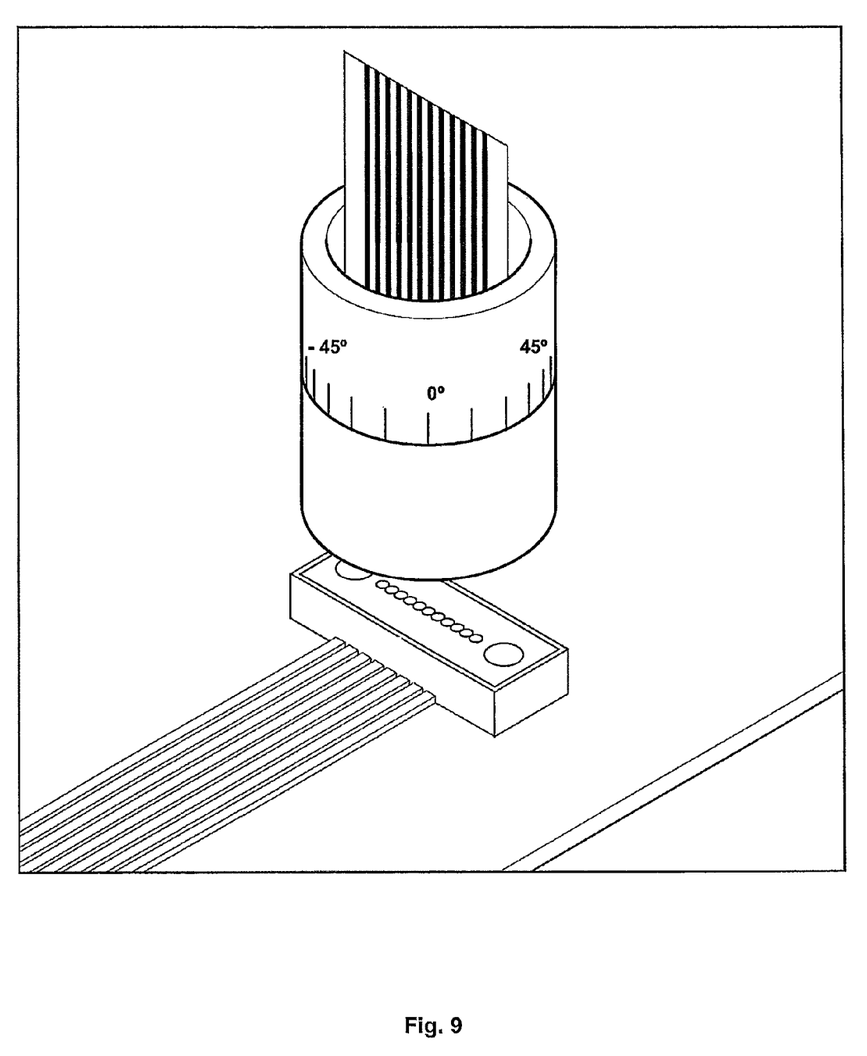

FIGS. 8 and 9 show a schematic representation of an alternative embodiment of an optical connector. Like the example of FIGS. 4 to 7 the connector has an optical interface unit 26 and a number of waveguides 28 arranged on a flexible platform 22. The connector has an upper portion 34 and a lower portion 36. The upper portion 34 and the lower portion 36 are arranged so as to be rotatable relative to each other about a common longitudinal axis X. In this example, the angle of projection and reception of light from the connector is perpendicular to the bottom face 40 of the connector. In other words, the light is transmitted from the connector downwards from the connector and not orthogonally to the plane of the flexible support 22.

In such an embodiment, it would typically be required that within the optical interface in the backplane or user circuit to which the connector would be arranged, there would be provided some mirrored component so as to enable to transmit light received from the connector in the plane of the backplane and vice versa for light transmitted to the connector from the backplane. In any event, it will again be appreciated that the optical interface on the connector is mounted in such a way that it is movable about an axis orthogonal to the plane of the optical printed circuit board to which, in use it is connected to vary the launch and/or reception angle of light from and/or to the interface with respect to the housing.

Embodiments of the present invention have been described with particular reference to the examples illustrated. However, it will be appreciated that variations and modifications may be made to the examples described within the scope of the present invention.

The invention claimed is:

1. An optical printed circuit board connector arranged to be connected in use to a first printed circuit board, the connector comprising:
    a housing;
    an optical interface for connection in use to another optical interface on a second optical printed circuit board to which in use the connector is arranged to be connected,
    in which the optical interface on the connector is mounted such that it is movable about an axis orthogonal to the plane of the second printed circuit board to which, in use it is connected, to vary the launch and/or reception angle of light from and/or to the interface with respect to the housing
    wherein the optical interface is arranged at the distal end of a flexible planar layer, the flexible planar layer having its major plane substantially parallel to the major plane of the first optical printed circuit board, wherein movement of the optical interface is achieved by twisting of the flexible planar layer.

2. An optical printed circuit board connector according to claim 1, wherein the connector comprises an electrical interface unit.

3. An optical printed circuit board connector according to claim 2, wherein the electrical interface unit is provided on a rigid PCB material.

4. An optical printed circuit board connector according to claim 1, wherein the housing has an opening for receiving a user circuit for connection to the optical printed circuit board connector, wherein, in use, the user circuit is connected via the optical printed circuit board connector to an electro-optical printed circuit board, such as a backplane or data storage system midplane.

5. An optical printed circuit board connector according to claim 1, wherein the connector forms an integrated part of a user circuit such that the user circuit can be connected to an electro-optical printed circuit board for electrical and optical communication therebetween.

6. An optical printed circuit board connector according to claim 1, wherein the optical interface is a passive or an active optical interface.

7. An optical printed circuit board connector according to claim 1, wherein the angle of propagation of light from the optical interface is perpendicular or parallel to the plane of the first printed circuit board to which, in use, the connector is arranged to be connected.

8. An optical printed circuit board connector arranged to be connected in use to a first printed circuit board, the connector comprising:
    a housing;
    an optical interface for connection in use to another optical interface on a second optical printed circuit board to which in use the connector is arranged to be connected,
    a capstan assembly in which the optical interface is arranged,
    wherein the optical interface on the connector is mounted such that it is movable about an axis orthogonal to the plane of the second printed circuit board to which, in use it is connected, to vary the launch and/or reception angle of light from and/or to the interface with respect to the housing.

9. An optical printed circuit board connector according to claim 8, wherein capstan assembly comprises a first part arranged to be fixedly mounted to the housing and a second part, rotatably mounted to the first part and arranged to house the optical interface, such that upon twisting of the second part with respect to the first part, the angular orientation of the optical interface with respect to the connector housing and/or the plane of the first printed circuit board is varied.

10. An optical printed circuit board connector according to claim 9, wherein the movement between the first and second parts of the capstan is indexed.

11. A method of connecting an optical connector to an optical printed circuit board, the method comprising:
  providing a connector having a housing having a major plane and an optical interface at a distal end of the connector for connection in use to an optical interface on the optical printed circuit board; and
  varying, with respect to the connector housing, the angle of the optical interface arranged at the distal end of the connector by twisting along a vertical axis in the major plane to align the optical interface with an optical interface of the optical printed circuit board.

12. A method according to claim 11, wherein the optical interface on the connector has a launch angle orthogonal or parallel to the major plane.

13. A method according to claim 12, wherein the optical interface on the connector is active.

14. A method according to claim 11, wherein the optical interface on the connector is active.

15. An optical printed circuit board, comprising an optical printed circuit board section including one or more optical waveguides and a connector for connecting the optical printed circuit board to a second optical printed circuit board, wherein the connector comprises:
  a housing;
  an optical interface for connection in use to another optical interface on the said second optical printed circuit board,
  in which the optical interface on the connector is mounted such that it is movable about an axis orthogonal to the plane of the second optical printed circuit board to which it is in use connected vary the launch and/or reception angle of light from and/or to the interface with respect to the housing,
  wherein the optical interface is arranged at the distal end of a flexible planar layer, the flexible planar layer having its major plane substantially parallel to the major plane of the optical printed circuit board, wherein movement of the optical interface is achieved by twisting of the flexible planar layer.

* * * * *